United States Patent
Littmann et al.

(10) Patent No.: US 12,110,349 B2
(45) Date of Patent: Oct. 8, 2024

(54) HIGH-PRESSURE POLYMERIZATION PROCESS OF ETHYLENICALLY UNSATURATED MONOMERS IN A POLYMERIZATION REACTOR

(71) Applicant: Basell Polyolefine GmbH, Wesseling (DE)

(72) Inventors: Dieter Littmann, Muecke (DE); Andre-Armand Finette, Cologne (DE); Christoph Wolf, Pulheim-Dansweiler (DE); Michael Deuerling, Weilerswist (DE); Juergen Mohrbutter, Alfter (DE); Danir Khayrullin, Bruehl (DE); Giulia Mei, Ferrara (IT); Erich Neumann, Braunschweig (DE)

(73) Assignee: Basell Polyolefine GmbH, Wesseling (DE)

( * ) Notice: Subject to any disclaimer, the term of this patent is extended or adjusted under 35 U.S.C. 154(b) by 641 days.

(21) Appl. No.: 17/312,288

(22) PCT Filed: Dec. 16, 2019

(86) PCT No.: PCT/EP2019/085394
§ 371 (c)(1),
(2) Date: Jun. 9, 2021

(87) PCT Pub. No.: WO2020/127079
PCT Pub. Date: Jun. 25, 2020

(65) Prior Publication Data
US 2022/0106418 A1     Apr. 7, 2022

(30) Foreign Application Priority Data
Dec. 18, 2018 (EP) .................................... 18213368

(51) Int. Cl.
*C08F 10/02* (2006.01)
*B01J 3/00* (2006.01)
(Continued)

(52) U.S. Cl.
CPC ............... *C08F 10/02* (2013.01); *B01J 3/002* (2013.01); *B01J 3/02* (2013.01); *B01J 19/002* (2013.01);
(Continued)

(58) Field of Classification Search
CPC .......... C08F 2/01; C08F 2/02; C08F 2400/04
See application file for complete search history.

(56) References Cited

U.S. PATENT DOCUMENTS 3,336,281 A * 8/1967 Eilbracht ................ C08F 10/00
                                                    159/DIG. 10
6,562,915 B2   5/2003 Mahling et al.
(Continued)

FOREIGN PATENT DOCUMENTS

CN      204447943 U    7/2015
EP        266543 A2    5/1988
(Continued)

OTHER PUBLICATIONS

The International Search Report and Written Opinion for PCT/EP2019/085394 mailed Apr. 30, 2020.

*Primary Examiner* — Rip A Lee

(57) ABSTRACT

A process for polymerizing ethylene in a high-pressure polymerization system having a continuously operated polymerization reactor and a reactor blow down system having an emergency valve, a reactor blow down vessel containing an aqueous medium and a reactor blow down dump vessel, wherein the process includes the steps of monitoring the polymerization system for a disturbance, opening the emergency valve when a disturbance occurs to
(Continued)

allow the content of the polymerization system to expand into the reactor blow down vessel, contacting the content of the polymerization system in the reactor blow down vessel with the aqueous medium to obtain an aqueous polymer slurry, separating the polymer slurry and gaseous components, and transferring the polymer slurry to the reactor blow down dump vessel.

20 Claims, 2 Drawing Sheets

(51) Int. Cl.
    *B01J 3/02*     (2006.01)
    *B01J 19/00*     (2006.01)
    *B01J 19/24*     (2006.01)
    *C08F 2/01*     (2006.01)
    *C08F 2/02*     (2006.01)

(52) U.S. Cl.
    CPC ............ *B01J 19/2415* (2013.01); *C08F 2/01* (2013.01); *B01J 2219/00033* (2013.01); *B01J 2219/00162* (2013.01); *B01J 2219/0027* (2013.01); *C08F 2/02* (2013.01); *C08F 2400/04* (2021.01)

(56) References Cited

U.S. PATENT DOCUMENTS

| | | | |
|---|---|---|---|
| 7,365,039 B2 * | 4/2008 | Coalter, III | C08F 10/02 502/103 |
| 7,999,044 B2 * | 8/2011 | Hottovy | B01J 19/1837 422/138 |
| 2018/0257055 A1 | 9/2018 | Cornelissen et al. | |
| 2018/0345238 A1 | 12/2018 | Leung et al. | |

FOREIGN PATENT DOCUMENTS

| | | | | |
|---|---|---|---|---|
| EP | 272512 A2 | 6/1988 | | |
| WO | WO 00/53306 A1 * | 9/2000 | ............... | B01J 8/00 |
| WO | 2017098389 A1 | 6/2017 | | |
| WO | 2017194491 A1 | 11/2017 | | |

* cited by examiner

HIGH-PRESSURE POLYMERIZATION PROCESS OF ETHYLENICALLY UNSATURATED MONOMERS IN A POLYMERIZATION REACTOR

This application is the U.S. National Phase of PCT International Application PCT/EP2019/085394, filed Dec. 16, 2019, claiming benefit of priority to European Patent Application No. 18213368.6, filed Dec. 18, 2018, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a process for polymerizing or copolymerizing ethylenically unsaturated monomers to obtain an ethylene-based polymer in a high-pressure polymerization system.

BACKGROUND OF THE INVENTION

Polyethylene is prepared by different processes. In some instances, polymerization in the presence of free-radical initiators at elevated pressures is used to obtain polyethylene, including low density polyethylene (LDPE).

In some instances, a plant for preparing low density polyethylene includes a polymerization reactor which is an autoclave, a tubular reactor, or a combination of such reactors. In some instances and for pressurizing the reaction components, a set of two compressors, a primary compressor and a secondary compressor, is used. Sometimes, the set of compressors is designated as a hyper compressor. In some instances and at the end of the polymerization sequence, a high-pressure polymerization unit further includes apparatuses like extruders and granulators for pelletizing the obtained polymer. In some instances, the polymerization unit includes components for feeding monomers and comonomers, free-radical initiators, modifiers or other substances at one or more positions to the polymerization reaction. In some instances, plants for preparing polyethylene are constructed to be run continuously for long periods of time without signs of fatigue, thereby allowing long maintenance intervals.

In some instances, the polymerization process in a LDPE reactor is carried out at high pressures reaching 350 MPa. Under certain temperature and pressure conditions, ethylene decomposes rapidly in an explosive manner, yielding soot, methane and hydrogen. In some instances, the associated drastic increase in pressure and temperature represents a risk for the operational safety of the production plants. (In some instances, the decomposition temperatures are excessively high (>1000° C.).) In some instances, the temperatures damage the reactor tubes, thereby austenitizing the tube metal. At temperatures at which the metal austenitizes, martensite is formed in the reactor tubes if the material is cooled rapidly.

In some instances, leakage of monomer mixtures is a concern when reaction plants are run under high pressure and at high temperatures. In some instances and after detection of a leakage of monomers or reaction mixture, the polymerization process is interrupted and the polymerization plant is depressurized.

In some polyethylene plants, depressurization systems use a blow down vessel, which is located inside the reactor bay. In some emergencies, the shutdown includes depressurization of the secondary compressor and the reactor. The reactor content made from or containing hot ethylene and hot polymer is disposed into the reactor blow down vessel via one or more emergency expansion valves, thereby quenching the hot gases with water and separating the waste polymer from ethylene. In some instances, the latter is sent to atmosphere at a safe location, and the polymer is retained inside the blow down vessel. In some instances, the blow down vessel is opened and the reactor and the other systems connected to the reactor are fully depressurized, thereby emptying the blow down vessel from the polymer water slurry and purging hydrocarbons from the reactor, the blow down vessel, and the other systems. Consequently, the reactor system becomes contaminated with oxygen. Prior to restart of the polyethylene plant, the plant systems are rendered free of contaminants by purging the systems several times with nitrogen and subsequently with ethylene. Such operations are time consuming and may cause a reduction in yield during the initial startup phase.

SUMMARY OF THE INVENTION

In a general embodiment, the present disclosure provides a process for polymerizing ethylene, and optionally one or more comonomers, to obtain an ethylene-based polymer in a high-pressure polymerization system having
a) a continuously operated polymerization reactor having a reactor inlet and having a reactor outlet and
b) a reactor blow down system having a fluid communication system, adapted and arranged to be in fluid communication with the polymerization reactor via the fluid communication system, having
   b1) a reactor blow down vessel containing an aqueous quenching medium,
   b2) a first emergency valve arranged in the fluid communication system and adapted to open and close fluid communication between the polymerization reactor and the reactor blow down system,
   b3) a reactor blow down dump vessel arranged and adapted to be in fluid communication with the reactor blow down vessel, and
   b4) a drain valve in the fluid communication system between the reactor blow down vessel and the reactor blow down dump vessel adapted and arranged to open or close fluid communication between the reactor blow down vessel and the reactor blow down dump vessel,
wherein the reactor blow down vessel is installed above the reactor blow down dump vessel, and
wherein the process includes the steps of
A) monitoring the high-pressure polymerization system for a disturbance,
B) opening the first emergency valve b2), thereby allowing the content of the polymerization system made from or containing polymer and gaseous components to expand into the reactor blow down vessel via the fluid communication system, when a disturbance occurs and wherein the drain valve b4) is closed,
C) contacting the content of the polymerization system in the reactor blow down vessel with the aqueous quenching medium, thereby obtaining an aqueous polymer slurry,
D) separating the aqueous polymer slurry and the gaseous components, and
E) transferring the aqueous polymer slurry to the reactor blow down dump vessel by opening the drain valve b4).

In some embodiments, the reactor blow down system further has b5) a blow down separator or a combination of blow down separator elements, arranged and adapted for receiving the aqueous polymer slurry from the reactor blow down dump vessel and separating the aqueous quenching medium from the polymer of the aqueous polymer slurry, and b6) a circulation pump arranged and adapted to return the separated aqueous quenching medium to the blow down dump vessel, wherein the process further includes the steps of F) transferring the aqueous polymer slurry from the reactor blow down dump vessel to the blow down separator or the first element of the combination of blow down separator elements b5) and G) returning the separated aqueous quenching medium to the blow down dump vessel by use of the circulation pump b6).

In some embodiments, the reactor blow down system b) further has
- b7) a nitrogen blanketing system,
- b8) a pressure control system, and/or
- b9) a fill-level control system.

In some embodiments, the high-pressure polymerization system further has
- c) a pressure control valve,
- d) a post reactor cooler, and
- e) a separation vessel or a cascade of separation vessels, wherein the post reactor cooler is in fluid communication with the continuously operated polymerization reactor via f) a first connecting line, wherein the separation vessel or the cascade of separation vessels is in fluid communication with the post reactor cooler via g) a second connecting line, and wherein the pressure control valve is adapted and arranged to control fluid communication between the continuously operated polymerization reactor and the post reactor cooler.

In some embodiments, the high-pressure polymerization system further has h) a third connecting line between the reactor blow down vessel and the first connecting line, which branches off the first connecting line downstream of the pressure control valve, and i) a second emergency valve adapted and arranged to open and close the third connecting line, thereby enabling or preventing fluid communication with the reactor blow down vessel, and/or j) a fourth connecting line between the reactor blow down vessel and the second connecting line and k) a third emergency valve adapted and arranged to open and close the fourth connecting line, thereby enabling or preventing fluid communication with the reactor blow down vessel, wherein the process further includes, after step A), prior to step C), and instead of step B), the step of B') opening the first emergency valve b2) and the second emergency valve g) and/or the third emergency valve l), thereby allowing the content of the polymerization system made from or containing polymer and gaseous components to expand into the closed reactor blow down vessel via the fluid communication system and via the third connecting line h) and/or the fourth connecting line i), when a disturbance occurs and wherein the drain valve b4) is closed.

In some embodiments, the reactor blow down vessel b1) further has a gas outlet.

In some embodiments, following an occurrence of a disturbance, the polymerization is restarted after transferring the aqueous polymer slurry to the reactor blow down dump vessel, thereby emptying the reactor blow down vessel, and closing the first emergency valve, the combination of previously open emergency valves, and the drain valve b4).

In some embodiments, the first emergency valve or the combination of previously open emergency valves are closed after step B) or B') while the fluid communication system, or the fluid communication system and the third connecting line and/or the fourth connecting line experience a positive pressure.

In some embodiments, the reactor blow down vessel and the reactor blow down dump vessel are inside a protective enclosure. In some embodiments, the blow down separator or the combination of blow down separator elements are outside a protective enclosure. In some embodiments, the circulation pump or the circulation pumps are outside a protective enclosure.

In some embodiments, the drain valve b4) is opened to transfer the aqueous polymer slurry to the reactor blow down dump vessel after the first emergency valve or the combination of previously open emergency valves is closed.

In some embodiments, the present disclosure further provides a high-pressure polymerization system having a) a continuously operable polymerization reactor having a reactor inlet and having a reactor outlet and b) a reactor blow down system adapted and arranged to be in fluid communication with the polymerization reactor via a fluid communication system having
- b1) a reactor blow down vessel,
- b2) a first emergency valve arranged in the fluid communication system and adapted to open and close fluid communication between the polymerization reactor and the reactor blow down system,
- b3) a reactor blow down dump vessel arranged and adapted to be in fluid communication with the reactor blow down vessel, and
- b4) a drain valve in the fluid communication system between the reactor blow down vessel and the reactor blow down dump vessel adapted and arranged to open or close the reactor blow down vessel, thereby enabling or preventing fluid communication with the reactor blow down dump vessel, wherein the reactor blow down vessel is installed above, and being in fluid communication with, the reactor blow down dump vessel.

In some embodiments, the reactor blow down system further has b5) a blow down separator or a combination of blow down separator elements, arranged and adapted for receiving the aqueous polymer slurry from the reactor blow down dump vessel and separating the aqueous quenching medium from the polymer of the aqueous polymer slurry, and b6) a circulation pump arranged and adapted to return the separated aqueous quenching medium to the blow down dump vessel.

In some embodiments, the reactor blow down system b) further has
- b7) a nitrogen blanketing system,
- b8) a pressure control system, and/or
- b9) a fill-level control system.

In some embodiments, the high-pressure polymerization system further has
- c) a pressure control valve,
- d) a post reactor cooler, and
- e) a separation vessel or a cascade of separation vessels, wherein the post reactor cooler is in fluid communication with the continuously operated polymerization reactor via f) a first connecting line, wherein the separation vessel or the cascade of separation vessels is in fluid communication with the post reactor cooler via g) a second connecting line, and wherein the pressure control valve is adapted and arranged to control fluid communication between the continuously operated polymerization reactor and the post reactor cooler.

In some embodiments, the high-pressure polymerization further has h) a third connecting line between the reactor blow down vessel and the first connecting line which branches off the first connecting line downstream of the pressure control valve and i) a second emergency valve adapted and arranged to open and close the third connecting line, thereby enabling or preventing fluid communication with the reactor blow down dump vessel, and/or j) a fourth connecting line between the reactor blow down vessel and the second connecting line and k) a third emergency valve adapted and arranged to open and close the fourth connecting line, thereby enabling or preventing fluid communication with the reactor blow down dump vessel.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

Figure 1:
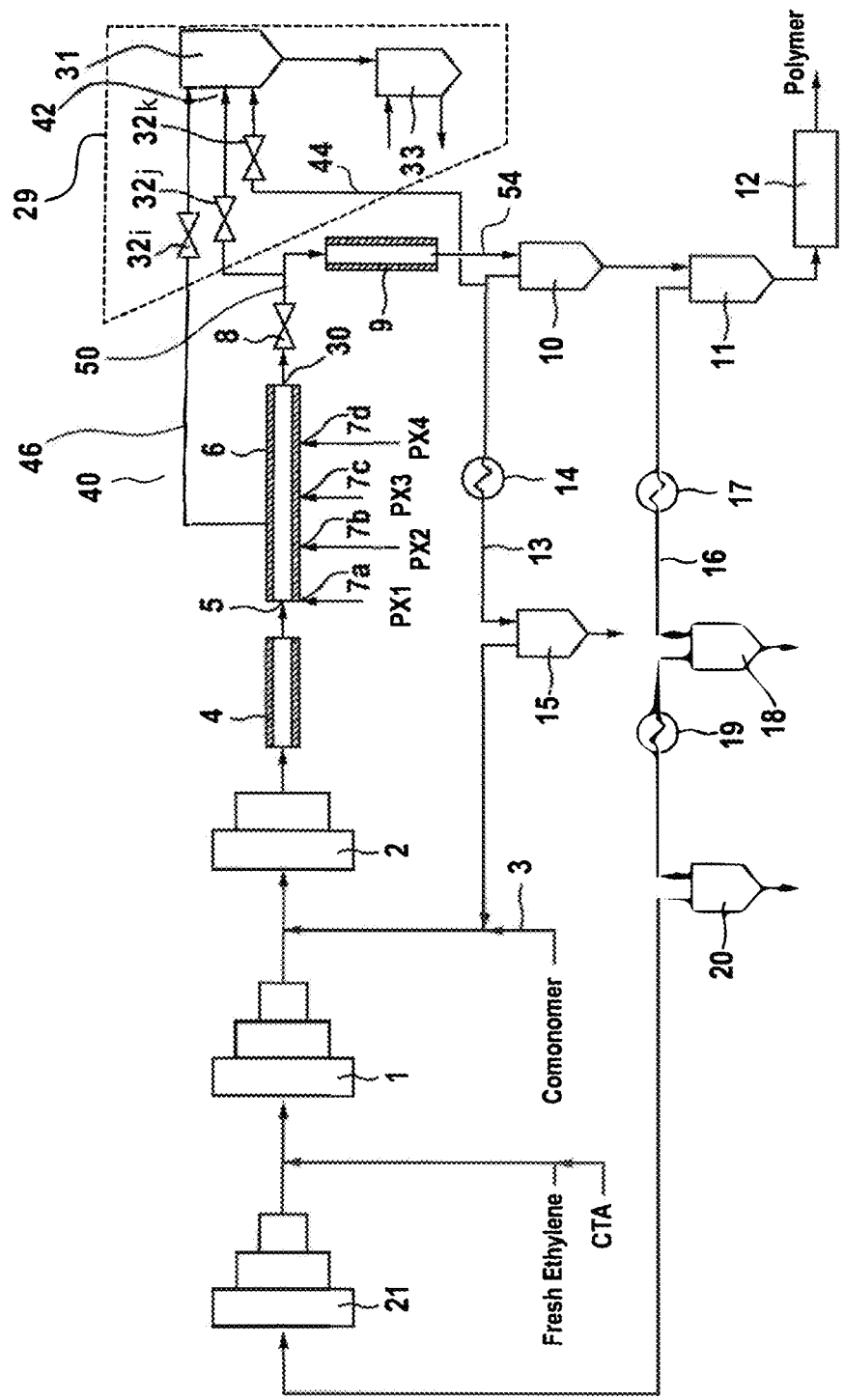
FIG. 1 is a schematic showing a set-up for carrying out a process for polymerizing ethylene.

In some embodiments, the present disclosure provides a process for polymerizing ethylene, and optionally one or more comonomers, to obtain an ethylene-based polymer in a high-pressure polymerization system.

As used herein, the term "and/or" is defined inclusively, such that the term "a and/or b" includes the sets: "a and b", "a or b", "a", and "b". In some embodiments, "and" in "a and/or b" refers to two entities "a" and "b", wherein one of the entities is present. In some embodiments, "and" in "a and/or b" refers to two entities 'a' and "b", wherein both entities are present.

As used herein, the terms "above" and "top" refer to the arrangement of elements in the high-pressure polymerization system as assembled and in accordance with the gravitational force of earth. Accordingly, a bottom section is closer to the center of earth than a top section. This use of terms does not preclude a non-usable stage, wherein the arrangement deviates, for example, as during transportation of a system to an installation site.

In some embodiments, the present disclosure provides a process for polymerizing ethylene, and optionally one or more comonomers, to obtain an ethylene-based polymer in a high-pressure polymerization system having a) a continuously operated polymerization reactor having a reactor inlet and having a reactor outlet. In some embodiments, the high-pressure polymerization system has a combination of polymerization reactors. In some embodiments, the monomers are brought to the polymerization pressure by one or more compressors in a sequence of compression stages. In some embodiments, the compressed monomers are passed through a pre-heater or a pre-cooler and then transferred into the polymerization reactor at the reactor inlet. In addition, a reaction mixture obtained by the polymerization leaves the reactor at the reactor outlet through a pressure control valve and is optionally cooled by a post reactor cooler. Subsequently, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line and the gaseous components separated off in a second stage at an absolute pressure in the range of from 0.1 MPa to 0.5 MPa are recycled to the first stage of the sequence of compression stages via a low-pressure gas recycle line, and the polymeric components obtained by the polymerization are transformed into pellets.

In some embodiments, the polymerization is a homopolymerization of ethylene or a copolymerization of ethylene with one or more other monomers, wherein these monomers are free-radically copolymerizable with ethylene under high pressure. In some embodiments, the copolymerizable monomers are selected from the group consisting of $\alpha,\beta$-unsaturated $C_3$-$C_8$-carboxylic acids, derivatives of $\alpha,\beta$-unsaturated $C_3$-$C_8$-carboxylic acids, and 1-olefins. In some embodiments, the derivatives of $\alpha,\beta$-unsaturated $C_3$-$C_8$-carboxylic acids are unsaturated $C_3$-$C_{15}$-carboxylic esters or anhydrides. In some embodiments, vinyl carboxylates are used as comonomers. In some embodiments, the vinyl carboxylate is vinyl acetate. In some embodiments, the comonomer is selected from the group consisting of propene, 1-butene, 1-hexene, acrylic acid, n-butyl acrylate, tert-butyl acrylate, 2-ethylhexyl acrylate, vinyl acetate, and vinyl propionate.

In some embodiments and for copolymerization, the proportion of comonomer or comonomers in the reaction mixture is from 1 to 50% by weight, alternatively from 3 to 40% by weight, based on the amount of monomers, that is, the sum of ethylene and other monomers. In some embodiments, the comonomers are fed at more than a single point to the reactor set-up. In some embodiments, the comonomers are fed to the suction side of the secondary compressor.

As used herein, the terms "polymers" or "polymeric materials" refer to substances made from or containing at least two monomer units. In some embodiments, the polymers or polymeric materials are low density polyethylenes having an average molecular weight $M_n$ of more than 20 000 g/mole. As used herein, the term "low density polyethylene" (LDPE) includes ethylene homopolymers and ethylene copolymers. In some embodiments, the process of the present disclosure prepares oligomers, waxes and polymers having a molecular weight Mn of less than 20 000 g/mole.

In some embodiments, the process of the present disclosure is a radical polymerization carried out in the presence of free-radical polymerization initiators. In some embodiments, initiators for starting the polymerization in the respective reaction zones are substances that produce radical species under the conditions in the polymerization reactor. In some embodiments, the initiators are selected from the group consisting of oxygen, air, azo compounds, and peroxidic polymerization initiators. In some embodiments, the polymerization is carried out by using oxygen, fed in the form of pure oxygen or as air. In some embodiments, the polymerization is initiated with oxygen and the initiator is first mixed with the ethylene feed and then fed to the reactor. In some embodiments, a stream made from or containing monomer and oxygen is fed to the beginning of the polymerization reactor. In some embodiments, the stream made from or containing monomer and oxygen is fed to one or more points along the reactor, thereby creating two or more reaction zones. In some embodiments, the initiator is selected from the group consisting of organic peroxides and azo compounds. In some embodiments, individual initiators or mixtures of various initiators are used. In some embodiments, initiators are commercially available from Akzo Nobel under the trade names Trigonox® or Perkadox®.

In some embodiments, the molecular weight of the polymers is altered by the addition of modifiers which act as chain-transfer agents. In some embodiments, the modifiers are selected from the group consisting of hydrogen, aliphatic and olefinic hydrocarbons, ketones, aldehydes, and saturated aliphatic alcohols. In some embodiments, the hydrocarbons are selected from the group consisting of propane, butane, pentane, hexane, cyclohexane, propene, 1-butene, 1-pentene, and 1-hexene. In some embodiments, the ketones are selected from the group consisting of acetone, methyl ethyl ketone (2-butanone), methyl isobutyl ketone, methyl isoamyl ketone, diethyl ketone, and diamyl ketone. In some embodiments, the aldehydes are selected from the group consisting of formaldehyde, acetaldehyde and propionaldehyde. In some embodiments, the saturated aliphatic alcohols are selected from the group consisting of methanol, ethanol, propanol, isopropanol, and butanol. In some embodiments, the modifier is a saturated aliphatic aldehyde, alternatively propionaldehyde. In some embodiments, the modifiers are selected from the group consisting of 1-olefins and aliphatic hydrocarbons. In some embodiments, the 1-olefins are selected from the group consisting of propene, 1-butene, and 1-hexene. In some embodiments, the aliphatic hydrocarbon is propane.

In some embodiments, the high-pressure polymerization is carried out at pressures of from 110 MPa to 500 MPa, alternatively from 160 MPa to 350 MPa, alternatively from 200 MPa to 330 MPa, for polymerization in a tubular reactor. In some embodiments, the high-pressure polymerization is carried out at pressures of from 110 MPa to 500 MPa, alternatively from 110 MPa to 300 MPa, alternatively 120 MPa to 280 MPa, for polymerization in an autoclave reactor. In some embodiments, the polymerization temperatures are in the range of from 100° C. to 350° C., alternatively from 180° C. to 340° C., alternatively from 200° C. to 330° C., for polymerization in a tubular reactor. In some embodiments, the polymerization temperatures are in the range of from 110° C. to 320° C., alternatively from 120° C. to 310° C., for polymerization in an autoclave reactor.

In some embodiments, the high-pressure reactors are tubular reactors or autoclave reactors. In some embodiments, the polymerization is carried out in one or more tubular reactors or one or more autoclave reactors or combinations of such reactors. In some embodiments, the polymerization reactor is a tubular reactor.

In some embodiments, the high-pressure autoclave reactors are stirred reactors and have a length-to-diameter ratio in a range from 2 to 30, alternatively from 2 to 20. In some embodiments, the autoclave reactors have one or more reaction zones, alternatively from 1 to 6 reaction zones, alternatively from 1 to 4 reaction zones. The number of reaction zones depends on the number of agitator baffles which separate individual mixed zones within the autoclave reactor. In high-pressure polymerization systems, the polymerization or the first polymerization is carried out in an autoclave reactor. In some embodiments, the polymerization reactor is an autoclave reactor. In some embodiments, the first reactor of a reactor cascade is an autoclave reactor. In some embodiments, the polymerization or the first polymerization is carried out in an autoclave reactor and the reaction mixture coming from the compressors is first passed through a pre-cooler before entering the autoclave reactor.

In some embodiments, the tubular reactors are long, thick-walled pipes, alternatively from about 0.5 km to 4 km, alternatively from 1 km to 3 km, alternatively from 1.5 km to 2.5 km long. In some embodiments, the inner diameter of the pipes is in the range of from about 30 mm to 120 mm. alternatively from 60 mm to 100 mm. In some embodiments, the tubular reactors have a length-to-diameter ratio of greater than 1000:1, alternatively from 10000:1 to 40000:1, alternatively from 25000:1 to 35000:1.

In some embodiments, the tubular reactors have at least two reaction zones, alternatively from 2 to 6 reaction zones, alternatively from 2 to 5 reaction zones. The number of reaction zones is given by the number of feeding points for the initiator. In some embodiments, a feeding point is an injection point for a solution of azo compounds or organic peroxides. Fresh initiator is added to the reactor, where the initiator decomposes into free radicals and initiates further polymerization. It is believed that the generated heat of the reaction raises the temperature of the reaction mixture because more heat is generated than is removed through the walls of the tubular reactor. The rising temperature increases the rate of decomposition of the free-radical initiators and accelerates polymerization until the free-radical initiator is consumed. Thereafter, no further heat is generated and the temperature decreases again because the temperature of the reactor walls is lower than that of the reaction mixture. Accordingly, the part of the tubular reactor downstream of an initiator feeding point wherein the temperature rises is the "reaction" zone. The part thereafter is a "cooling" zone, wherein the temperature decreases. The amount and nature of added free-radical initiators determines how much the temperature rises and accordingly allows for adjusting that value. In some embodiments, the temperature rise is set to be in the range of from 70° C. to 170° C. in the first reaction zone and 50° C. to 130° C. for subsequent reaction zones depending on the product specifications and the reactor configuration. In some embodiments, the tubular reactor is equipped with cooling jackets for removing the heat of the reaction. In some embodiments, the reaction zones of the tubular reactor are cooled by cooling jackets.

In some embodiments, the compression of the reaction gas composition to the polymerization pressure is carried out by one or more compressors in a sequence of compression stages. In some embodiments, a primary compressor first compresses the reaction gas composition to a pressure of from 10 MPa to 50 MPa and a secondary compressor further compresses the reaction gas composition to the polymerization pressure of from 110 MPa to 500 MPa. In some embodiments, the primary compressor and the secondary compressor are multistage compressors. In some embodiments, one or more stages of one or both compressors are separated. In some embodiments, the stages are divided into separated compressors. In some embodiments, a series of a primary compressor and a secondary compressor is used for compressing the reaction gas composition to the polymerization pressure. In some embodiments, the whole primary compressor is designated as "primary compressor." In some embodiments, the one or more first stages of the primary compressor, which compress the recycle gas from the low-pressure product separator to the pressure of the fresh ethylene feed, is designated as the "booster" compressor and then the one or more subsequent stages are designated as the "primary" compressor even though the booster compressor and the subsequent stages are part of the same apparatus.

In some embodiments, the high-pressure polymerization system has a pre-heater upstream of a tubular reactor, for heating the reaction gas composition to a temperature capable of initiating the polymerization. In some embodiments, the reaction gas composition provided by the secondary compressor is fed via a pre-heater to the inlet of the tubular reactor. In some embodiments, a part of the reaction gas composition compressed by the secondary compressor is fed via the pre-heater to the inlet of the tubular reactor and the remainder of the reaction gas composition compressed by the secondary compressor is fed as one or more side streams to the tubular reactor downstream of the inlet of the tubular reactor. In some embodiments, from 30 to 90% by weight, alternatively from 40 to 70% by weight, of the reaction gas composition provided by the secondary compressor is fed to the inlet of the tubular reactor and from 10 to 70% by weight, alternatively from 30 to 60% by weight, of the reaction gas composition provided by the secondary compressor is fed as one or more side streams to the tubular reactor downstream of the inlet of the tubular reactor.

In some embodiments, the high-pressure polymerization system for carrying out the polymerization includes the polymerization reactor, the reactor blow down system, and two or more gas recycle lines for recycling unreacted monomers into the polymerization process. In some embodiments, the reaction mixture obtained in the polymerization reactor is transferred to a first separation vessel and separated into a gaseous fraction and a liquid fraction at an absolute pressure of from 15 MPa to 50 MPa. In some embodiments, the first separation vessel is referred to as a high-pressure product separator. The gaseous fraction withdrawn from the first separation vessel is fed via a high-pressure gas recycle line to the suction side of the secondary compressor. In some embodiments and in the high-pressure gas recycle line, the gas is purified by several purification steps. In some embodiments, the removed components are entrained polymer or oligomers. The liquid fraction withdrawn from the first separation vessel is transferred to a second separation vessel and further separated, at reduced pressure, alternatively at an absolute pressure in the range of from 0.1 MPa to 0.5 MPa, in polymeric and gaseous components. In some embodiments, the liquid fraction withdrawn from the first separation vessel is made from or containing dissolved monomers in an amount of 20 to 40% of weight. In some embodiments, the monomers are ethylene and comonomers. In some embodiments, the second separation vessel is referred to as a low-pressure product separator. In some embodiments, the gaseous fraction withdrawn from the second separation vessel is fed via a low-pressure gas recycle line to the primary compressor, alternatively to the foremost of the stages. In some embodiments, the low-pressure gas recycle line provides several purification steps for purifying the gas. In some embodiments, the high-pressure polymerization system includes additional separation steps for separating additional gaseous fractions from the reaction mixtures and additional gas recycle lines for feeding such additional gaseous fractions made from or containing unreacted monomers to a compressor. In some embodiments, the additional separation steps are between the first separation step and the second separation step, operating at an intermediate pressure.

In some embodiments, the recycled gas coming from the low-pressure gas recycle line is compressed by the first stages of the primary compressor to the pressure of the fresh feed of ethylenically unsaturated monomers and thereafter combined with the fresh gas feed and the combined gases are further compressed in the primary compressor to the pressure of from 10 MPa to 50 MPa. In some embodiments, the unsaturated monomers are ethylene. In some embodiments, the primary compressor has five or six compression stages, two or three before adding the fresh gas and two or three after adding the fresh gas. In some embodiments, the secondary compressor has two stages; a first stage, which compresses the gas to a pressure in the range from 50 MPa to 150 MPa, and a second stage, which further compresses the gas to the final polymerization pressure.

In some embodiments, the pressure within the polymerization reactor is controlled by a pressure control valve, which is arranged at the outlet of the polymerization reactor and through which the reaction mixture leaves the reactor. In some embodiments, the pressure control valve is a valve arrangement for reducing the pressure of the reaction mixture leaving the reactor to the pressure within the first separation vessel.

In some embodiments, the high-pressure polymerization system has a post reactor cooler downstream of the polymerization reactor for cooling the reaction mixture. In some embodiments, the post reactor cooler is arranged upstream of the pressure control valve. In some embodiments, the post reactor cooler is arranged downstream of the pressure control valve. In some embodiments, the post reactor cooler is arranged downstream of the pressure control valve.

In some embodiments, the polymerization reactors are in a chamber having a surrounding protective wall.

In some embodiments, the polymeric components obtained by the polymerization are finally transformed into pellets. In some embodiments, the pellets are formed by extruders or granulators. In some embodiments, the ethylene-based polymer produced by the process is a LDPE having a density in the range from 0.910 g/cm$^3$ to 0.940 g/cm$^3$.

In some embodiments, the process uses a high-pressure polymerization system having a) a continuously operated polymerization reactor having a reactor inlet and having a reactor outlet, b) a reactor blow down system having a fluid communication system, adapted and arranged to be in fluid communication with the polymerization reactor via the fluid communication system, having b1) a reactor blow down vessel containing an aqueous quenching medium, b2) a first emergency valve, alternatively a multitude of first emergency valves distributed over the length of a high-pressure tubular reactor, arranged in the fluid communication system and adapted to open and close fluid communication between the polymerization reactor and the reactor blow down system, b3) a reactor blow down dump vessel arranged and adapted to be in fluid communication with the reactor blow down vessel, and b4) a drain valve in the fluid communication system between the reactor blow down vessel and the reactor blow down dump vessel adapted and arranged to open or close fluid communication between the reactor blow down vessel and the reactor blow down dump vessel, wherein the reactor blow down vessel is installed above the reactor blow down dump vessel, and wherein the process includes the steps of A) monitoring the high-pressure polymerization system for a disturbance, B) opening the first emergency valve b2), thereby allowing the content of the polymerization system made from or containing polymer and gaseous components to expand into the reactor blow down vessel via the fluid communication system, when a disturbance occurs and wherein the drain valve b4) is closed, C) contacting the content of the polymerization system in the reactor blow down vessel with the aqueous quenching medium, thereby obtaining an aqueous polymer slurry, D) separating the aqueous polymer slurry and the gaseous components, and E) transferring the aqueous polymer slurry to the reactor blow down dump vessel by opening the drain valve b4).

In some embodiments, the high-pressure polymerization system is monitored for a disturbance. When a disturbance occurs, the first emergency valve is opened and the content of the polymerization system made from or containing polymer and gaseous components expands into the reactor blow down vessel, thereby interrupting the high-pressure polymerization in a controlled manner. As used herein, the term "disturbance" refers to a deviation in polymerization conditions to support termination of the polymerization. The monitoring of the high-pressure polymerization system occurs by measuring various parameters with respect to the conditions of the high-pressure polymerization system. These parameters include pressures and temperatures at various positions of the polymerization system, filling levels of vessels, positions of valves, hydrocarbon concentrations in the surrounding of the high-pressure polymerization system and vibrations in the polymerization system. In some embodiments and if a parameter deviates by more than 10% from desired polymerization conditions, an occurrence of a disturbance is established and step B) of the process is carried out.

In some embodiments, the drain valve b4) is remotely operated or operable.

In some embodiments, the drain valve b4) is opened to transfer the aqueous polymer slurry to the reactor blow down dump vessel after the first emergency valve or the combination of previously open emergency valves is closed.

In some embodiments, the reactor blow down system further has b5) a blow down separator or a combination of blow down separator elements, arranged and adapted for receiving the aqueous polymer slurry from the reactor blow down dump vessel and separating the aqueous quenching medium from the polymer of the aqueous polymer slurry, and b6) a circulation pump arranged and adapted to return the separated aqueous quenching medium to the blow down dump vessel, wherein the process further includes the steps of F) transferring the aqueous polymer slurry from the reactor blow down dump vessel to the blow down separator or to the first element of the combination of blow down separator elements b5) and G) returning the separated aqueous quenching medium to the blow down dump vessel by use of the circulation pump b6). In some embodiments, the transfer of the aqueous polymer slurry from the reactor blow down dump vessel to the blow down separator or the first element of the combination of blow down separator elements b5) occurs by gravity or a pump, which also returns the separated aqueous quenching medium to the blow down dump vessel. In some embodiments, the pump is the circulation pump b6). In some embodiments, the pump, which transfers the aqueous polymer slurry from the reactor blow down dump vessel to the blow down separator or the first element of the combination of blow down separator elements, is a different pump than the circulation pump, which returns the separated aqueous quenching medium to the blow down dump vessel. In some embodiments, the separation of the aqueous polymer slurry into an aqueous phase and wet polymer occurs by a combination of blow down separator elements b5). In some embodiments, the combination of blow down separator elements b5) is a combination of two blow down separator elements, where the first element is a buffer vessel for holding the aqueous polymer slurry in a spatial arrangement to the second element combination of blow down separator elements and the second element is a separating device. In some embodiments, the separating device is selected from the group consisting of a centrifuge and a sieving device. In some embodiments, the sieving device is an inclined sieve.

In some embodiments, the reactor blow down vessel b1) further has a gas outlet for removing the gaseous components having been separated from the aqueous polymer slurry. In some embodiments, the reactor blow down vessel is nitrogen blanketed although being open to the atmosphere.

In some embodiments, the reactor blow down system b) further has
b7) a nitrogen blanketing system, alternatively nitrogen blanketing the reactor blow down vessel and nitrogen blanketing the reactor blow down dump vessel,
b8) a pressure control system, alternatively controlling the pressure of the reactor blow down dump vessel, and/or
b9) a fill-level control system, alternatively controlling the filling level of the reactor blow down vessel and controlling the filling level of the reactor blow down dump vessel.

In some embodiments, the high-pressure polymerization system further has
c) a pressure control valve,
d) a post reactor cooler, and
e) a separation vessel or a cascade of separation vessels, alternatively a first separation vessel and a second separation vessel in series,
wherein the post reactor cooler is in fluid communication with the continuously operated polymerization reactor via f) a first connecting line, wherein the separation vessel or the cascade of separation vessels are in fluid communication with the post reactor cooler via g) a second connecting line, and wherein the pressure control valve is adapted and arranged to control fluid communication between the continuously operated polymerization reactor and the post reactor cooler. In some embodiments, the high-pressure polymerization system further has h) a third connecting line between the reactor blow down vessel and the first connecting line, which branches off the first connecting line downstream of the pressure control valve, and i) a second emergency valve adapted and arranged to open and close the third connecting line, thereby enabling or preventing fluid communication with the reactor blow down vessel, and/or j) a fourth connecting line between the reactor blow down vessel and the second connecting line and k) a third emergency valve adapted and arranged to open and close the fourth connecting line, thereby enabling or preventing fluid communication with the reactor blow down vessel, wherein the process further includes, after step A), prior to step C), and instead of step B), the step of
B') opening the first emergency valve b2) and the second emergency valve g) and/or the third emergency valve l), thereby allowing the content of the polymerization system made from or containing polymer and gaseous components to expand into the closed reactor blow down vessel via the fluid communication system and via the third connecting line h) and/or the fourth connecting line i), when a disturbance occurs and wherein the drain valve b4) is closed.

In some embodiments, following an occurrence of a disturbance, the polymerization is restarted after transferring the aqueous polymer slurry to the reactor blow down dump vessel, thereby emptying the reactor blow down vessel, and closing the first emergency valve, the combination of previously open emergency valves, and the drain valve b4).

In some embodiments, the first emergency valve or the combination of previously open emergency valves are closed after step B) or B') while the fluid communication system, or the fluid communication system and the third connecting line and/or the fourth connecting line experience a positive pressure.

In some embodiments, the reactor blow down vessel and the reactor blow down dump vessel are inside a protective enclosure. In some embodiments, the protective enclosure is referred to as a "reactor bay". In some embodiments, the blow down separator or the combination of blow down separator elements are outside a protective enclosure. In some embodiments, the circulation pump or the circulation pumps are outside a protective enclosure.

In some embodiments, the drain valve b4) is opened, alternatively remotely opened, to transfer the aqueous polymer slurry to the reactor blow down dump vessel after the first emergency valve or the combination of previously open emergency valves is closed.

In some embodiments, the aqueous quenching medium is water. In some embodiments, the aqueous quenching medium is made from or containing water and a polymerization inhibitor. In some embodiments, the process is to produce ethylene copolymers. In some embodiments, the polymerization inhibitor is hydroquinone or a pH buffer agent. In some embodiments, the buffer agents are made from or containing phosphate buffers. In some embodiments, the phosphate buffers are obtained by mixing sodium hydrogen phosphate and sodium hydroxide.

In some embodiments, the process uses a high-pressure polymerization system having
a) a continuously operable polymerization reactor having a reactor inlet and having a reactor outlet and
b) a reactor blow down system adapted and arranged to be in fluid communication with the polymerization reactor via a fluid communication system having
  b1) a reactor blow down vessel,
  b2) a first emergency valve arranged in the fluid communication system and adapted to open and close fluid communication between the polymerization reactor and the reactor blow down system,
  b3) a reactor blow down dump vessel arranged and adapted to be in fluid communication with the reactor blow down vessel, and
  b4) a drain valve in the fluid communication system between the reactor blow down vessel and the reactor blow down dump vessel adapted and arranged to close the reactor blow down vessel, thereby enabling or preventing fluid communication with the reactor blow down dump vessel,
wherein the reactor blow down vessel is installed above, and being in fluid communication with the reactor blow down dump vessel. In some embodiments, the reactor blow down system further has b5) a blow down separator or a combination of blow down separator elements, arranged and adapted for receiving aqueous polymer slurry from the reactor blow down dump vessel and separating aqueous quenching medium from the polymer of the aqueous polymer slurry, and b6) a circulation pump arranged and adapted to return the separated aqueous quenching medium to the blow down dump vessel.

In some embodiments, the reactor blow down system b) further has
  b7) a nitrogen blanketing system, alternatively nitrogen blanketing the reactor blow down vessel and nitrogen blanketing the reactor blow down dump vessel,
  b8) a pressure control system, alternatively controlling the pressure of the reactor blow down dump vessel, and/or
  b9) a fill-level control system, alternatively controlling the filling level of the reactor blow down vessel and controlling the filling level of the reactor blow down dump vessel.

In some embodiments, the high-pressure polymerization system further has c) a pressure control valve,
d) a post reactor cooler, and
e) a separation vessel or a cascade of separation vessels, alternatively a first separation vessel and a second separation vessel in series,
wherein the post reactor cooler is in fluid communication with the continuously operated polymerization reactor via f) a first connecting line, wherein the separation vessel or the cascade of separation vessels are in fluid communication with the post reactor cooler via g) a second connecting line, and wherein the pressure control valve is adapted and arranged to control fluid communication between the continuously operated polymerization reactor and the post reactor cooler. In some embodiments, the high-pressure polymerization system further has h) a third connecting line between the reactor blow down vessel and the first connecting line, which branches off the first connecting line downstream of the pressure control valve, and i) a second emergency valve adapted and arranged to open and close the third connecting line, thereby enabling or preventing fluid communication with the reactor blow down dump vessel, and/or j) a fourth connecting line between the reactor blow down vessel and the second connecting line and k) a third emergency valve adapted and arranged to open and close the fourth connecting line, thereby enabling or preventing fluid communication with the reactor blow down dump vessel.

Further features of the present disclosure will become apparent from the following description, in which exemplary embodiments of the disclosure are explained with reference to FIG. 1 and FIG. 2, by way of example and without limiting the disclosure.

FIG. 1 is a schematic showing a set-up of a high-pressure polymerization system for polymerizing ethylenically unsaturated monomers in a high-pressure polymerization system having a continuously operated tubular reactor (6) and a reactor blow down system (29) of the process and the high-pressure polymerization system of the present disclosure.

In some embodiments, fresh ethylene is firstly compressed to a higher pressure by a primary compressor (1) and then compressed to the reaction pressure of about 300 MPa using a secondary compressor (2). In some embodiments, the fresh ethylene is supplied to the primary compressor under a pressure of 1.7 MPa or 12 MPa. In some embodiments, the higher pressure achieved in the primary compressor is about 30 MPa. In some embodiments, chain transfer agents (CTA) are added to primary compressor (1) with the fresh ethylene. In some embodiments, comonomer is added upstream of the secondary compressor (2) via line (3). The reaction mixture leaving the primary compressor (2) is fed to pre-heater (4), where the reaction mixture is preheated to the reaction start temperature and then conveyed to the inlet (5) of the tubular reactor (6). In some embodiments, the reaction start temperature is in the range of from about 120° C. to 220° C.

In some embodiments, the tubular reactor (6) is a long, thick-walled pipe with cooling jackets to remove the liberated heat of reaction from the reaction mixture by a coolant circuit (not shown).

In some embodiments, the tubular reactor (6) has four spatially separated initiator injection points (7a), (7b), (7c), and (7d) for feeding initiators or initiator mixtures PX1, PX2, PX3 and PX4 to the reactor and accordingly also four reaction zones. By feeding free-radical initiators, which decompose at the temperature of the reaction mixture, to the tubular reactor (6), the polymerization reaction starts.

The reaction mixture leaves the tubular reactor (6) through pressure control valve (8) being incorporated in the first connecting line (50) and passes a post reactor cooler (9). Thereafter, the cooled reaction mixture is transferred via a second connecting line (54) to a first separation vessel (10). By use of this first separation vessel (10) and of a second separation vessel (11), the resulting polymer is separated off from unreacted ethylene and other low molecular weight compounds (monomers, oligomers, polymers, additives, solvent, etc.), discharged and pelletized via an extruder and granulator (12).

The ethylene and comonomers, which have been separated off in the first separation vessel (10), are fed back to the inlet end of the tubular reactor (6) in the high-pressure circuit (13). In some embodiments, the high-pressure circuit (13) is at about 30 MPa. In the high-pressure circuit (13), the gaseous material separated from the reaction mixture is first freed from other constituents in at least one purification stage and then added to the monomer stream between primary compressor (1) and secondary compressor (2). FIG. 1 shows one purification stage having a heat exchanger (14) and a separator (15). In some embodiments, a plurality of purification stages are used. In some embodiments, the plurality of purification stages are arranged in parallel. In some embodiments, the high-pressure circuit (13) separates waxes.

The ethylene which has been separated off in the second separation vessel (11), which further is made from or containing the major part of the low molecular weight products of the polymerization (oligomers) and the solvent, is worked up in the low-pressure circuit (16) in a plurality of separators with a heat exchanger being installed between each of the separators. In some embodiments, the low-pressure circuit is at an absolute pressure from about 0.1 to 0.5 MPa. FIG. 1 shows two purification stages having heat exchangers (17) and (19) and separators (18) and (20). In some embodiments, a single purification stage is used. In some embodiments, more than two purification stages are used. In some embodiments, the low-pressure circuit (16) separates oils and waxes.

The ethylene, which has passed the low-pressure circuit (16), is fed to a booster compressor (21), compressed to a pressure of about 4 MPa and then conveyed to primary compressor (1). In some embodiments, booster compressor (21) and primary compressor (1) are part of a single low-pressure compressor, that is, a single apparatus powered by a single motor.

The high-pressure polymerization system also has a reactor blow down system (29) having a reactor blow down vessel (31). In some embodiments, the reactor blow down system (29) is brought in fluid communication with the tubular reactor (6) by one or more connecting lines (46) having a first emergency valve (32$i$), a third connecting line (42) having a second disturbance valve (32$j$) and/or a fourth connecting line (44) having a third disturbance valve (32$k$). The reactor blow down vessel (31) is installed above a reactor blow down dump vessel (33).

Figure 2:
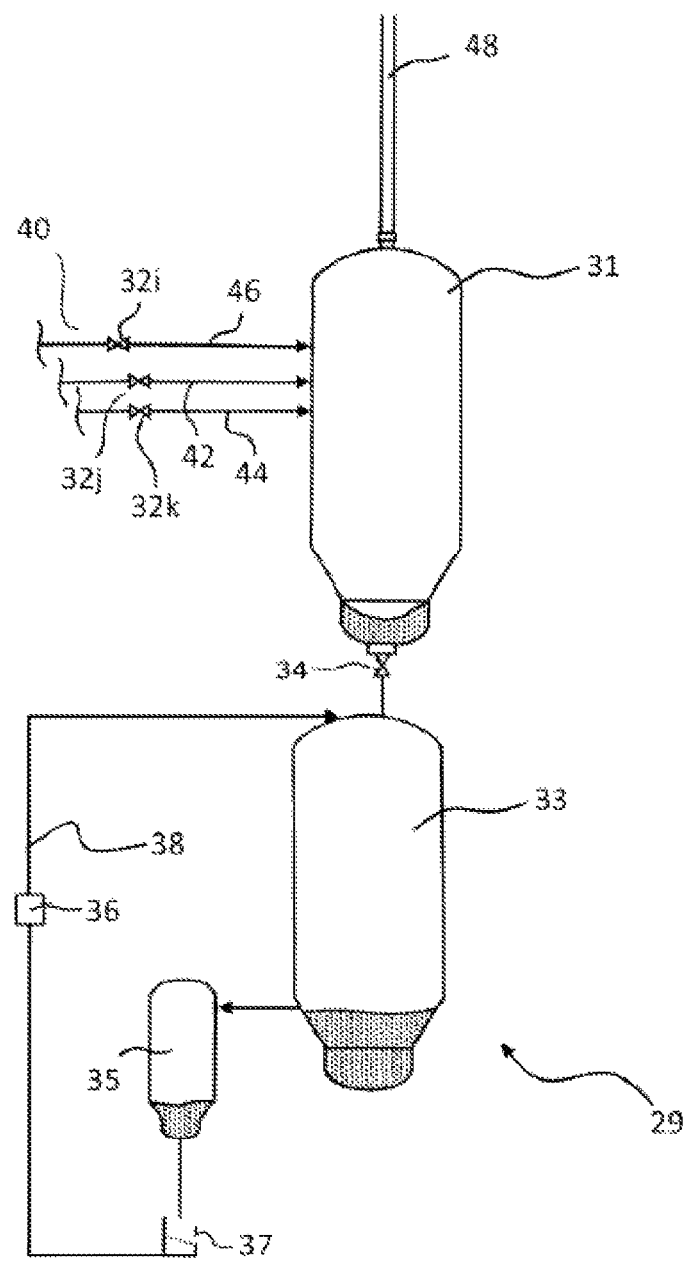
FIG. 2 is a schematic showing a reactor blow down system of a continuously operable polymerization reactor.

In some embodiments, the reactor blow down system (29) are as shown in FIG. 2. FIG. 2 shows a reactor blow down vessel (31); a fluid communication system (40) having a first emergency valve (32$i$) incorporated into a connecting line (46), a second disturbance valve (32$j$) incorporated into a third connecting line (42), a third disturbance valve (32$k$) incorporated into a fourth connecting line (44); and a reactor blow down dump vessel (33). In some embodiments, the first emergency valve (32$i$) is replaced with a multitude of first emergency valves (32$i$), each being incorporated into a separate connecting line (46) and each being part of the fluid communication system (40). The connecting line (46), the third connecting line (42) and the fourth connecting line (44) lead into the upper half of the side wall of the reactor blow down vessel (31).

The reactor blow down vessel (31) is located on top of the reactor blow down dump vessel (33) and is in fluid communication therewith. In some embodiments, a disturbance occurs when the pressure within the high-pressure polymerization system increases above a pre-determined pressure value. In some embodiments, the disturbance is observed by pressure sensors. When a disturbance occurs, the first emergency valve (32$i$) is opened and the content of the turbular reactor (6) is expanded into the reactor blow down vessel (31) containing an aqueous quenching medium. In some embodiments, the disturbance emergency valve (32$j$) and the third disturbance valve (32$k$) are also opened and the content of the connecting line (46) starting from the outlet (30) of the tubular reactor (6) and that of the post reactor cooler (9) are also expanded into the reactor blow down vessel (31). In some embodiments, the first emergency valve (32$i$), the second disturbance valve (32$j$) and the third disturbance valve (32$k$) are simultaneously opened.

Using an aqueous quenching medium, the polymer obtained in the polymerization reactor is solidified. In some embodiments, the polymer is solidified in the form of flakes. Concomitantly, the temperatures of the polymeric and the gaseous components are reduced. In some embodiments and in the reactor blow down vessel (31), the water/polymer mixture and the gaseous components are separated by releasing the gaseous components via an outlet or vent (48). After release of the gaseous components, the remaining water/polymer mixture is transferred into the reactor blow down dump vessel (33) by gravity upon opening of the drain valve (34). In some embodiments, after the reactor blow down vessel (31) is emptied and the first emergency valve (32$i$), the second disturbance valve (32$j$) and the third disturbance valve (32$k$) are closed, polymerization restarts instantaneously. In some embodiments and during shutdown, the polymerization system and the reactor blow down system (29) are kept under an ethylene atmosphere. In some embodiments, the first emergency valve (32$i$), the second disturbance valve (32$j$) and the third disturbance valve (32$k$) are closed while overpressure is observed at these valves or in the respective connecting lines. In some embodiments, the drain valve (34) between the reactor blow down vessel (31) and the reactor blow down dump vessel (33) are remotely opened. After dumping the content of the reactor blow down vessel (31) into the reactor blow down dump vessel (33), the drain valve (34) is closed. In some embodiments, the transfer of the polymer/water slurry is surveyed by a camera system (not shown), mounted on the reactor blow down vessel (31).

In some embodiments, the reactor blow down system (29) further has a combination of blow down separator elements (35) and (37) and a circulation pump (36) by which the aqueous quenching medium separated from the water/polymer slurry is returned to the reactor blow down dump vessel (33). In some embodiments, the first separator element (35) of the combination of blow down separator elements is a buffer vessel to which the content of reactor blow down dump vessel (33) is transferred by gravity. In some embodiments, the transfer is supported by nitrogen. The second separator element (37) of the combination of blow down separator elements is an inclined sieve which is used for retaining the polymer. Also, the transfer of the water/polymer slurry from first separator element (35) to second separator element (37) occurs by gravity. The aqueous phase separated from the water/polymer slurry by second separator element (37) is then conveyed via line (38) by circulation pump (36) to the reactor blow down dump vessel (33). This circulation of water is kept in operation until the polymer waste from the reactor blow down dump vessel (33) is removed and finally retained by inclined second separator element (37). In some embodiments and for safe operation of the reactor blow down system (29), nitrogen blanketing systems, pressure control systems and/or lever supervision systems (not shown) are used.

Surprisingly it was found that in case of a disturbance or even an emergency, e.g. due to the reactor pressure and/or the reactor temperature being above safe threshold values the polymerization reaction can be interrupted in order to reduce pressure and/or temperature without the need to open the high-pressure polymerization system. It has been found that the reactor vessel, including the secondary compressor, and in particular also the closable reactor blow down system can be kept under an ethylene atmosphere during the entire shutdown and restart procedure and contamination of the reactor system with oxygen can be avoided. This is facilitated by closing the first emergency valve or any combination of previously open emergency valves after step B) or B') as long as the fluid communication system, or the fluid communication system and the third connecting line and/or fourth connecting line are experiencing a positive pressure. Different from prior art disposal systems, the steps of depressurizing the polymerization reactor and purging the blow down vessel and the polymerization reactor both prior and after emptying the blow down vessel become unnecessary and manual operator intervention is not needed. With the process of the present disclosure, the content of the polymerization system is expanded into the reactor blow down vessel and contacted with the aqueous quenching system. In some embodiments, the pressure in the continuous high-pressure polymerization system is rapidly reduced from about or above 200 MPa to 0.1 MPa. In some embodiments, rapidly reduces refers to a minute or less. In some embodiments and while the gaseous components are released from this vessel, the water/polymer mixture is transferred into the reactor blow down dump vessel. In some embodiments, the transfer is automatic. It has also surprisingly been found that the polymerization can restart immediately after the reactor blow down vessel has been emptied, i.e. after a much shorter time period than according to established pressure reducing processes.

In some embodiments and with the process and the high-pressure polymerization system of the present disclosure, the reactor is automatically depressurized by automatically opening the emergency valve when a disturbance or an emergency occurs, thereby putting the reactor into a safe condition. That is, the process and the high-pressure polymerization system of the present disclosure permit stopping safely polymerization in case of an emergency or deviations from the standard operating conditions. In some instances, an emergency includes events such as fire, explosion, earthquake, or polyethylene decomposition. In some instances, disturbances include deviations from the standard operating conditions.

Other features and embodiments of the subject matter of the present disclosure will be readily apparent to person of ordinary skill in the art after reading the foregoing disclosure. In this regard, while specific embodiments have been described in considerable detail, variations and modifications of these embodiments can be effected without departing from the spirit and scope of the disclosure as described and claimed.

What is claimed is:

1. A process for polymerizing ethylene, and optionally one or more comonomers, to obtain an ethylene-based polymer in a high-pressure polymerization system comprising
    a) a continuously operated polymerization reactor having a reactor inlet and having a reactor outlet and
    b) a reactor blow down system comprising a fluid communication system, adapted and arranged to be in fluid communication with the polymerization reactor via the fluid communication system, comprising
        b1) a reactor blow down vessel containing an aqueous quenching medium,
        b2) a first emergency valve arranged in the fluid communication system and adapted to open and close fluid communication between the polymerization reactor and the reactor blow down system,
        b3) a reactor blow down dump vessel arranged and adapted to be in fluid communication with the reactor blow down vessel, and
        b4) a drain valve in the fluid communication system between the reactor blow down vessel and the reactor blow down dump vessel adapted and arranged to open or close fluid communication between the reactor blow down vessel and the reactor blow down dump vessel,
        wherein the reactor blow down vessel is installed above the reactor blow down dump vessel, and
    wherein the process comprises the steps of
    A) monitoring the high-pressure polymerization system for a disturbance, and
    B) opening the first emergency valve, thereby allowing a content of the high-pressure polymerization system comprising polymer and gaseous components to expand into the reactor blow down vessel via the fluid communication system, when a disturbance occurs and wherein the drain valve is closed,
    C) contacting the content of the polymerization system in the reactor blow down vessel with the aqueous quenching medium, thereby obtaining an aqueous polymer slurry,
    D) separating the aqueous polymer slurry and the gaseous components, and
    E) transferring the aqueous polymer slurry to the reactor blow down dump vessel by opening the drain valve.

2. The process of claim 1, wherein the reactor blow down system further comprises b5) a blow down separator or a combination of blow down separator elements, arranged and adapted for receiving the aqueous polymer slurry from the reactor blow down dump vessel and separating the aqueous quenching medium from the polymer of the aqueous polymer slurry, and b6) a circulation pump arranged and adapted to return a separated aqueous quenching medium to the blow down dump vessel,
    wherein the process further comprises the steps of F) transferring the aqueous polymer slurry from the reactor blow down dump vessel to the blow down separator or the first element of the combination of blow down separator elements and G) returning the separated aqueous quenching medium to the blow down dump vessel by use of the circulation pump.

3. The process of claim 1, wherein the reactor blow down system b) further comprises
    b7) a nitrogen blanketing system,
    b8) a pressure control system and/or
    b9) a fill-level control system.

4. The process of claim 1, wherein the high-pressure polymerization system further comprises c) a pressure control valve,
d) a post reactor cooler, and
e) a separation vessel or a cascade of separation vessels,
wherein the post reactor cooler is in fluid communication with the continuously operated polymerization reactor via f) a first connecting line, wherein the separation vessel or the cascade of separation vessels is in fluid communication with the post reactor cooler via g) a second connecting line, and wherein the pressure control valve is adapted and arranged to control fluid communication between the continuously operated polymerization reactor and the post reactor cooler.

5. The process of claim 4, wherein the high-pressure polymerization system further comprises h) a third connecting line between the reactor blow down vessel and the first connecting line, which branches off the first connecting line downstream of the pressure control valve, and i) a second emergency valve adapted and arranged to open and close the third connecting line, thereby enabling or preventing fluid communication with the reactor blow down vessel, and/or
j) a fourth connecting line between the reactor blow down vessel and the second connecting line and k) a third emergency valve adapted and arranged to open and close the fourth connecting line, thereby enabling or preventing fluid communication with the reactor blow down vessel,
wherein the process further comprises after step A), prior to step C), and instead of step B), the step of
B') opening the first emergency valve and the second emergency valve and/or the third emergency valve, thereby allowing the content of the high-pressure polymerization system comprising polymer and gaseous components to expand into the reactor blow down vessel via the fluid communication system and via the third connecting line h) and/or the fourth connecting line i), when a disturbance occurs and wherein the drain valve is closed.

6. The process of claim 1, wherein the reactor blow down vessel further comprises a gas outlet.

7. The process of claim 1, wherein, following an occurrence of a disturbance, polymerization is restarted after transferring the aqueous polymer slurry to the reactor blow down dump vessel, thereby emptying the reactor blow down vessel, and closing the first emergency valve, a combination of previously open emergency valves, and the drain valve.

8. The process of claim 5, wherein the first emergency valve or a combination of previously open emergency valves are closed after step B) or B') when the fluid communication system, or the fluid communication system and the third connecting line and/or the fourth connecting line experience a positive pressure.

9. The process according to claim 2, wherein the reactor blow down vessel and the reactor blow down dump vessel are inside a protective enclosure and/or wherein the blow down separator or a combination of blow down separator elements and/or the circulation pump is outside a protective enclosure.

10. The process according to claim 1, wherein the drain valve is opened to transfer the aqueous polymer slurry to the reactor blow down dump vessel after the first emergency valve or a combination of previously open emergency valves is closed.

11. A high-pressure polymerization system comprising
a) a continuously operable polymerization reactor having a reactor inlet and having a reactor outlet and b) a reactor blow down system adapted and arranged to be in fluid communication with the polymerization reactor via a fluid communication system comprising
b1) a reactor blow down vessel,
b2) a first emergency valve arranged in the fluid communication system and adapted to open and close fluid communication between the polymerization reactor and the reactor blow down system,
b3) a reactor blow down dump vessel arranged and adapted to be in fluid communication with the reactor blow down vessel, and
b4) a drain valve in the fluid communication system between the reactor blow down vessel and the reactor blow down dump vessel adapted and arranged to close the reactor blow down vessel, thereby enabling or preventing fluid communication with the reactor blow down dump vessel,
wherein the reactor blow down vessel is installed above, and being in fluid communication with, the reactor blow down dump vessel.

12. The high-pressure polymerization system of claim 11, wherein the reactor blow down system further comprises b5) a blow down separator or a combination of blow down separator elements, arranged and adapted for receiving an aqueous polymer slurry from the reactor blow down dump vessel and separating an aqueous quenching medium from a polymer of the aqueous polymer slurry, and b6) a circulation pump arranged and adapted to return for returning the separated aqueous quenching medium to the blow down dump vessel.

13. The high-pressure polymerization system of claim 11, wherein the reactor blow down system b) further comprises
b7) a nitrogen blanketing system,
b8) a pressure control system, and/or
b9) a fill-level control system.

14. The high-pressure polymerization system of claim 11, wherein the high-pressure polymerization system further comprises
c) a pressure control valve,
d) a post reactor cooler, and
e) a separation vessel or a cascade of separation vessels,
wherein the post reactor cooler is in fluid communication with the continuously operable polymerization reactor via f) a first connecting line, wherein the separation vessel or the cascade of separation vessels is in fluid communication with the post reactor cooler via g) a second connecting line, and wherein the pressure control valve is adapted and arranged to control fluid communication between the continuously operated polymerization reactor and the post reactor cooler.

15. The high-pressure polymerization system of claim 11, further comprising h) a third connecting line between the reactor blow down vessel and the first connecting line which branches off the first connecting line downstream of the pressure control valve and i) a second emergency valve adapted and arranged to open and close the third connecting line, thereby enabling or preventing fluid communication with the reactor blow down dump vessel, and/or j) a fourth connecting line between the reactor blow down vessel and the second connecting line and k) a third emergency valve adapted and arranged to open and close the fourth connecting line, thereby enabling or preventing fluid communication with the reactor blow down dump vessel.

16. The process of claim 2, wherein the blow down separator or the combination of blow down separator elements and/or the circulation pump are outside a protective enclosure.

17. The process of claim 5, wherein, following an occurrence of a disturbance, polymerization is restarted after transferring the aqueous polymer slurry to the reactor blow down dump vessel, thereby emptying the reactor blow down vessel, and closing the first emergency valve, a combination of previously open emergency valves, and the drain valve.

18. The process of claim 5, wherein the first emergency valve or a combination of previously open emergency valves are closed after step B') when the fluid communication system and the third connecting line and/or the fourth connecting line experience a positive pressure.

19. The process of claim 5, wherein the drain valve is opened to transfer the aqueous polymer slurry to the reactor blow down dump vessel after the first emergency valve or a combination of previously open emergency valves is closed.

20. The high-pressure polymerization system of claim 12, wherein the reactor blow down system b) further comprises
- b7) a nitrogen blanketing system,
- b8) a pressure control system, and/or
- b9) a fill-level control system.

\* \* \* \* \*